Nov. 19, 1963 J. T. GRAGSON ETAL 3,111,473
SEPARATION OF INORGANIC SOLIDS FROM HYDROCARBON OILS
Filed Dec. 27, 1960
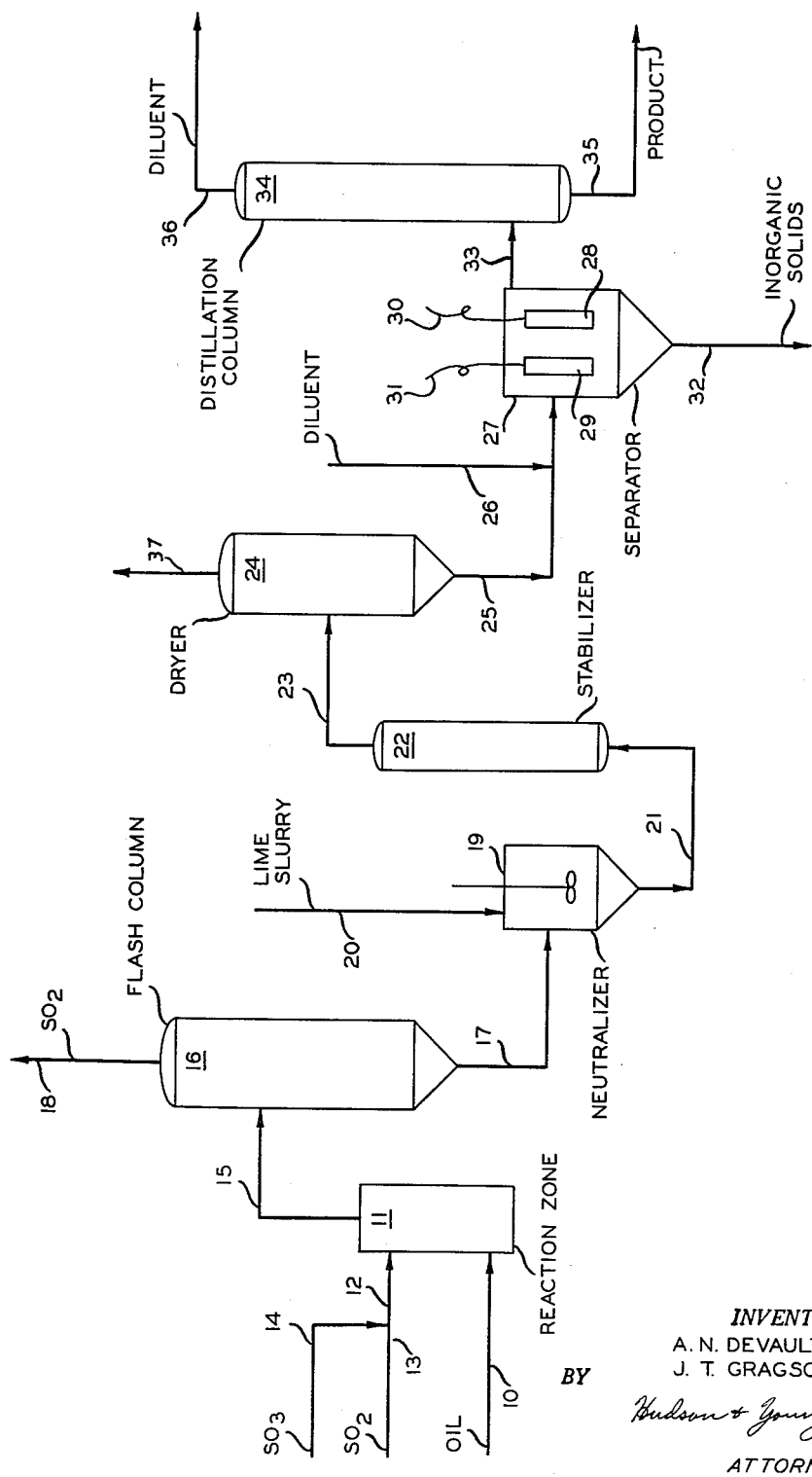
INVENTORS
A. N. DEVAULT
J. T. GRAGSON
BY
*Hudson & Young*
ATTORNEYS

United States Patent Office 3,111,473
Patented Nov. 19, 1963

3,111,473
SEPARATION OF INORGANIC SOLIDS FROM HYDROCARBON OILS
James T. Gragson and Albert N. De Vault, Bartlesville, Okla., assignors to Phillips Petroleum Company, a corporation of Delaware
Filed Dec. 27, 1960, Ser. No. 78,694
7 Claims. (Cl. 204—184)

This invention relates to an improved process of separating inorganic solids from hydrocarbon oils. In one specific aspect, this invention relates to an improved process of separating inorganic solids from a hydrocarbon oil containing a salt of a petroleum sulfonic acid.

Conventionally, sulfonic acids are prepared by the sulfonation of crude or refined petroleum fractions. Concentrated sulfuric acid, sulfur trioxide, and chlorosulfonic acid have been employed as sulfonating agents. The sulfonation processes yield an "acid sludge" which is oil insoluble and which contains what is generally referred to as green sulfonic acids. The product oil solution, however, contains the higher molecular weight oil soluble sulfonic acids. These oil soluble acids are frequently designated as mahogany sulfonic acids and are the acids referred to herein more generally as petroleum sulfonic acids. In some cases, the oil soluble acids can be produced to the substantial exclusion of green acids. In the practice of this invention, the green acids, if present, are separated from the mahogany acids and the mahogany acids are neutralized and further processed as hereinafter described. In the recovery of an oil solution containing the product petroleum sulfonates, it is necessary to separate said oil solution from inorganic solids produced as a result of the neutralization step and contained therein.

Accordingly, an object of this invention is to provide an improved process for preparing hydrocarbon oils containing petroleum sulfonates.

Another object of this invention is to provide an improved process for separating inorganic solids from hydrocarbon oils containing petroleum sulfonates.

Another object of this invention is to provide an improved process for separating inorganic solids from hydrocarbon oils containing alkaline earth metal salts of petroleum sulfonic acids, said solids produced in the neutralization of petroleum sulfonic acids.

Other objects, advantages, and features of our invention will be readily apparent to those skilled in the art from the following description and the appended claims.

The drawing is a schematic diagram of the inventive process.

Referring to the drawing, a highly refined lubricating oil having a viscosity in the range of 140–700 SUS at 210° F., preferably 200–230 SUS at 210° F., and a viscosity index of at least 85 is passed to a reaction zone 11 by means of conduit 10. This previously refined oil has been prepared from a lube crude by a series of process steps such as thermal fractionation, vacuum distillation, propane fractionation, solvent extraction and dewaxing. The oil to be sulfonated can be first diluted with a nonreactive diluent such as pentane, hexane, paraffinic alkylate or Stoddard solvent to decrease the viscosity and increase the ease of handling the mixing, but this step not herein illustrated is not necessary. The oil is sulfonated by contacting said oil with fuming sulfuric acid or with sulfur trioxide dissolved in sulfur dioxide of ethylene chloride at a contact temperature in the range of 58–200° F. A contact time in the range of 5–90 minutes is preferred. The acid to oil weight ratio is commonly in the range of 0.1:1.0 to about 1.0:1.0 when 20% fuming sulfuric acid is employed. When sulfur trioxide and sulfur dioxide is the sulfonating agent, the sulfur trioxide to oil weight ratio is maintained equivalent to that available from the sulfuric acid. When either sulfonic acid or sulfur trioxide is used as the sulfonating agent, sulfuric acid and sulfur dioxide are present in the effluent emitted from the reaction zone 11.

Sulfur dioxide and ethylene chloride, when present, are substantially removed from the reaction zone effluent stream by passing said effluent stream via conduit 15 to a first column 16 wherein said sulfur dioxide and ethylene chloride are removed by flashing. Sulfur dioxide and ethylene chloride, when present, are removed from flash column 16 by means of conduit 18. The remainder of the reaction zone 11 effluent stream is passed from flash column 16 via conduit 17 to a neutralizer 19.

The removal of sulfuric acid from the reaction zone 11 product stream is quite difficult and not practical. Therefore, a neutralization step employing a neutralizing agent follows the sulfur dioxide removal step. When the alkaline earth metal derivatives of the petroleum sulfonic acids are desired, neutralization is commonly effected by use of the oxides, hydroxides, carbonates and bicarbonates. For example, lime (CaO), calcium hydroxide, calcium carbonate, barium carbonate, and strontium carbonate can be employed as neutralizing agents. The amount of neutralizing agent employed is sufficient to neutralize the reaction zone effluent. The presence of inorganic solids in the reaction product is a result of the neutralizing step. For example, in the neutralization of the reaction zone effluent with an aqueous slurry or solution of calcium hydroxide, calcium sulfate and sulfite are produced along with the desired calcium petroleum sulfonate, even though only sufficient calcium hydroxide is used to neutralize the acid-oil mixture. It is the usual practice to employ excess calcium hydroxide, thus causing further amounts of inorganic material to be present in the reaction mixture.

The neutralized reaction mixture can be held at an elevated temperature for a period of time in order to insure completion of the neutralization reaction. This can be suitably accomplished by passing said reaction mixture from neutralizer 19 via conduit 21 to a stabilizer 22. The reaction mixture can be stabilized by maintaining said reaction mixture in stabilizer 22 at a temperature in the range of 300–500° F. for a period of time between about 0.1 to 100 hours.

The aqueous phase is then removed by passing the neutralized reaction mixture to a drier 24 wherein said aqueous phase is removed by flashing, leaving a suspension of solid calcium sulfate and calcium hydroxide in a liquid phase of calcium petroleum sulfonate dissolved in oil, or in a diluent-oil mixture where a diluent has been employed. The flashing step is sufficiently severe to remove any discrete aqueous phase but need not produce a completely anhydrous mixture free of dissolved water. This can be accomplished by subjecting the reaction mixture to flash vaporization at a temperature in the range of 250–350° F. and at subatmospheric pressures. To this flashed effluent, further organic diluent can be added by means of conduit 26 to reduce the viscosity to a lower level when desirable. Although not necessarily limited thereto, preferably organic diluent in the range of 5 to 25 volumes of diluent per volume of hydrocarbon oil feed is employed.

The flashed effluent containing suspended inorganic solids is then passed to separator 27 wherein said flashed effluent is passed between electrodes 28 and 29, said electrodes usually consisting of parallel flat plates spaced from 2 to about 50 millimeters apart and having a D.C. voltage across them. The potential gradient can be as low as 100 volts per centimeter or as high as to approach the arcing potential, which is ordinarily in the range of about 25,000–30,000 volts per centimeter. A potential gradient in the range of 500–20,000 volts per centimeter is preferred. Direct current is passed to electrodes 28 and 29 by means of lead wires 30 and 31, respectively. Although higher and lower temperatures can be utilized, the temperature of the mixture in separator 27 is ordinarily in the range of about 50–150° F. Residence time in separator 27 depends on the viscosity of the solution, the distance between the electrodes, the potential gradient used, and the amount of solids to be removed. Ordinarily, the residence time will range from about 5 minutes to about 10 hours, usually from 15 minutes to two hours.

The process step of separating the inorganic solids can be conducted either batchwise or continuously. In separator 27, the inorganic solids migrate to the negative electrodes, plate out and slough off to fall to the bottom of the vessel. The solids accumulating in the bottom of separator 27 can be removed either continuously or intermittently, as desired. In the continuous separation process step herein illustrated, streamline flow must be maintained between electrodes as turbulent flow would cause mixing too rapid for the separation method to overcome. It is, of course, within the scope of this invention to provide a pluraltiy of separators operating on a semi-batchwise principle, wherein a feed stream can be passed to one separator until said separator is filled. The feed stream is then passed to a second separator. In this manner, a longer non-turbulent residence time can be more effectively maintained while at the same time operating the sulfonation process continuously. It is, of course, within the scope of this invention to provide electrodes other than the parallel flat plates herein illustrated.

It has been observed that when calcium hydroxide is used as a neutralizing agent, increased rate of inorganic solids separation in separator 27 are obtained when an excess of solid calcium hydroxide is present in the feed to separator 27. Dry calcium hydroxide can be added directly to separator 27 when less than the optimum is present. The amount of additional calcium hydroxide to be added is readily determined by tests. Ordinarily, calcium hydroxide can be added to total about three equivalent weights for each equivalent weight of sulfonic acid.

A liquid product stream is removed from separator 27 via conduit 33 and passed to a distillation column 34. Distillation column 34 is operated so as to effectively separate the previously added diluent from the hydrocarbon oil containing petroleum sulfonate.

The following examples are presented as illustrative of the inventive process. In each of the examples, the initial slurry for the tests was prepared from a solvent refined lubricating oil having a viscosity of about 200 SUS at 210° F. and a viscosity index of about 95. The oil was sulfonated with sulfur trioxide in sulfur dioxide with a weight ratio of sulfur trioxide to oil of 0.08. The sulfonation temperature was 110° F. The sulfur dioxide was then removed by flashing and the mixture diluted with about one volume of Stoddard solvent. The sulfonic acid was neutralized using an aqueous lime slurry, the lime used being about 60 percent excess over that needed to neutralize the acidity of the oil. The water was flashed off at 255° F. and additional Stoddard solvent added to bring the Stoddard solvent to about 2 volumes for each volume of sulfonate plus oil. This is the starting point for the following examples:

*Example I*

The naphtha was removed from the neutralized mixture by distillation. A portion of the residue weighing two grams was diluted with 75 milliliters of pentane and placed in a 100 ml. glass beaker. Platinum electrodes were fabricated from a 1-inch by 1-inch sheet and immersed in the slurry. The electrodes were spaced about ⅝-inch apart. The electrodes were connected to a high-voltage direct current generator (Spellman PM–30). The voltage was adjusted to 2,000 volts. After about 40 minutes, the reaction mixture was clarified and a deposit of material had collected on the negative electrode. The pentane was stripped from the clarified liquor, the sulfated ash content on the pentane-free residue was found to be 4.77 percent.

*Example II*

The sample of the slurry containing the Stoddard solvent was diluted with about 25 volumes of pentane. Using the same apparatus as in Example I, the pentane-diluted sample and an undiluted sample were treated using 600 volts. Both samples cleared, but the pentane-diluted sample cleared much more rapidly.

*Example III*

A first sample of slurry was treated by the addition of 0.5 gram of $Ca(OH)_2$ to 80 grams of slurry. A second sample was treated in a similar manner with anhydrous $CaSO_4$. Each of the above samples was treated in the electrolytic cell described in Example I using 6,000–7,000 volts. The sample treated with $Ca(OH)_2$ cleared in 1.5 hours, while the sample treated with $CaSO_4$ did not clear under the same conditions. After clarification in the electrolytic cell, the sample treated with $Ca(OH)_2$ was stripped of solvent and the residue was analyzed. The sulfated ash content was 4.92 percent.

The original slurry sample was centrifuged for one hour. As the sample was not bright after this treatment, it was filtered over a filter aid. The solvent was stripped and a sulfated ash determination showed 4.87 percent.

Example I has demonstrated the effectiveness of the inventive process of separating inorganic solids from a mixture of oil containing a petroleum sulfonate. Example II has demonstrated an increased efficiency of the inventive separation process when the viscosity of the mixture is lowered and Example III demonstrated an increase in efficiency with the addition of excess neutralizing agent.

In the sulfonation of a hydrocarbon oil, inorganic solids, occurring as a result of neutralizing sulfonic acids produced, are separated by the inventive process. The inventive process is applicable to the separation of inorganic solids in sulfonation processes wherein the hydrocarbon oil contains an alkaline earth metal salt of a petroleum sulfonate and where said inorganic solids occur as a result of neutralizing the sulfonic acids produced in the sulfonation process.

As will be evident to those skilled in the art, various modifications of this invention can be made, or followed, in the light of the foregoing disclosure and discussion without departing from the spirit or scope thereof.

We claim:

1. In the process of sulfonating a hydrocarbon oil which comprises contacting in a reaction zone a refined hydarocarbon oil having a viscosity in the range of 140–700 SUS at 210° F. with a sulfonating agent selected from the group consisting of sulfuric acid, sulfur trioxide and chlorosulfonic acid, separating sulfur dioxide from the reaction zone effluent, neutralizing said reaction zone effluent with an alkaline earth metal neutralizing agent in a neutralization zone, and separating water from the neutralization zone effluent containing inorganic solids; an improvement which comprises passing the substantially water-free neutralization zone effluent containing said inorganic solids mixture between two electrodes in a separation zone, passing a direct current between said electrodes, maintaining a potential gradient between said electrodes greater than 100 volts per centimeter and less than the arcing potential so as to separate said inorganic solids from said effluent, withdrawing from said separation zone a hydrocarbon oil-petroleum sulfonate product substantially free of inorganic solids, and withdrawing from said separation zone inorganic solids.

2. The process of claim 1 wherein the potential gradient between said electrodes is in the range of 500–20,000 volts per centimeter.

3. The process of claim 1 wherein said neutralizing agent is calcium hydroxide and additional neutralizing agent in excess of that necessary to neutralize said reaction zone effluent is admixed with the feed to said separation zone.

4. A process of sulfonating a hydrocarbon oil which comprises contacting in a reaction zone a refined hydrocarbon oil having a viscosity in the range of 140–700 SUS at 210° F. with a sulfonating agent selected from the group consisting of sulfuric acid, sulfuric trioxide and chlorosulfonic acid, separating sulfur dioxide from the reaction zone effluent, neutralizing said reaction zone effluent with an alkaline earth metal neutralizing agent in a neutralization zone, separating water from the product neutralization zone effluent containing inorganic solids, admixing an organic diluent with the substantially water-free neutralization zone product mixture containing said inorganic solids, passing said neutralization zone product mixture between two electrodes in a separation zone, passing a direct current between said electrodes, maintaining a potential gradient between said electrodes greater than 100 volts per centimeter and less than the arcing potential so as to separate said inorganic solids from said effluent withdrawing from said separation zone an organic diluent-hydrocarbon oil-petroleum sulfonate mixture substantially free of inorganic solids, withdrawing said separation zone inorganic solids, passing said organic diluent-hydrocarbon oil-petroleum sulfonate mixture into a fractionation zone, withdrawing from said fractionation zone an organic diluent fraction, and withdrawing from said fractionation zone a hydrocarbon oil-petroleum sulfonate product.

5. The process of claim 4 wherein said neutralizing agent is calcium hydroxide and neutralizing agent in excess of that necessary to neutralize said reaction zone effluent is contacted with said reaction zone effluent in said neutralization zone.

6. The process of claim 5 wherein the potential gradient between said electrodes is in the range of 500–20,000 volts per centimeter.

7. The process of claim 4 wherein said sulfonating agent is sulfuric acid and the acid to oil contact weight ratio is in the range of 0.02:1.0 to about 0.2:1.0.

References Cited in the file of this patent

UNITED STATES PATENTS

| | | |
|---|---|---|
| 2,110,899 | Woeflin | Mar. 15, 1938 |
| 2,721,833 | Defoe et al. | Oct. 25, 1955 |
| 2,870,081 | Frey | Jan. 20, 1959 |
| 2,974,095 | Gordon et al. | Mar. 7, 1961 |
| 2,996,442 | Eberly | Aug. 15, 1961 |